(12) United States Patent
Ebuchi et al.

(10) Patent No.: US 9,104,350 B2
(45) Date of Patent: Aug. 11, 2015

(54) INFORMATION PROCESSING APPARATUS, AND PRINTING CONTROL METHOD FOR DISPLAYING SCREEN FOR SETTING VALUES

(71) Applicant: CANON KABUSHIKI KAISHA, Tokyo (JP)

(72) Inventors: Kazuhisa Ebuchi, Yokohama (JP); Masakazu Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/543,744

(22) Filed: Nov. 17, 2014

(65) Prior Publication Data

US 2015/0070728 A1 Mar. 12, 2015

Related U.S. Application Data

(63) Continuation of application No. 12/558,405, filed on Sep. 11, 2009, now Pat. No. 8,953,180.

(30) Foreign Application Priority Data

Nov. 13, 2008 (JP) .................................. 2008-291106

(51) Int. Cl.
*G06F 3/12* (2006.01)

(52) U.S. Cl.
CPC ............ *G06F 3/1205* (2013.01); *G06F 3/1204* (2013.01); *G06F 3/1257* (2013.01); *G06F 3/1258* (2013.01)

(58) Field of Classification Search
CPC ... G06F 3/1205; G06F 3/1204; G06F 3/1253; G06F 3/1208; G06F 3/1243; G06F 3/1255; G06F 3/1257; G06F 3/1284; G06F 17/211; G06F 17/248; H04N 2201/0094; H04N 1/0035; H04N 1/00482; H04N 1/00795; H04N 1/00811; H04N 1/2307; H04N 1/2338; H04N 1/32122; G06K 15/02; G06K 15/1806; G06K 15/1809
USPC ............... 358/1.13, 1.15, 1.1, 2.1, 3.27, 1.14, 358/453, 444; 709/224, 220; 715/810, 771; 347/16

See application file for complete search history.

(56) References Cited

U.S. PATENT DOCUMENTS

| | | | |
|---|---|---|---|
| 7,057,747 B1 * | 6/2006 | Minagawa | 358/1.13 |
| 2005/0190407 A1 * | 9/2005 | Yokoyama | 358/2.1 |
| 2005/0270555 A1 * | 12/2005 | Lee | 358/1.13 |
| 2005/0283735 A1 * | 12/2005 | Ferlitsch et al. | 715/771 |
| 2006/0044572 A1 * | 3/2006 | Nakayama | 358/1.1 |
| 2006/0224876 A1 * | 10/2006 | Kato | 713/1 |
| 2007/0177203 A1 * | 8/2007 | Kamasuka et al. | 358/1.15 |

* cited by examiner

*Primary Examiner* — Martin Mushambo
(74) *Attorney, Agent, or Firm* — Canon USA, Inc., IP Division

(57) ABSTRACT

An information processing apparatus for setting a setting value for print data to be transmitted to a printer, includes a selection unit configured to select a purpose from a plurality of printing purposes, and a display unit configured to display a screen for setting the setting value for the print data including a variable setting item for setting a setting value from a plurality of setting values associated with the printing purpose selected by the selection unit, and a fixed wherein setting values for the variable setting item and the fixed setting item are set by using different setting ways on the displayed screen.

19 Claims, 21 Drawing Sheets

| PRINTING PURPOSE / SET ITEM | NORMAL PRINTING | DOCUMENT PRINTING | PAPER-SAVED PRINTING | SNAPSHOT PRINTING |
|---|---|---|---|---|
| TYPE OF PAPER | PLAIN PAPER | PLAIN PAPER | PLAIN PAPER | GLOSSY PHOTO PAPER |
| PAPER SIZE | A4 | A4 | A4 | L |
| PRINT QUALITY | STANDARD | STANDARD | STANDARD | CLEAR |
| BORDERLESS FULL-SURFACE PRINTING | OFF | OFF | OFF | ON |
| CLEAR PROCESSING | OFF | OFF | OFF | ON |
| ALLOCATION PRINTING | OFF | OFF | ON (2 in 1) | OFF |
| BOTH-SIDE PRINTING | OFF | OFF | ON | OFF |
| COPY UNIT | OFF | ON | ON | OFF |
| MONOCHROME PRINTING | OFF | OFF | ON | OFF |
| . | . | . | . | . |
| . | . | . | . | . |
| . | . | . | . | . |

FIG.5

| SET ITEM \ PRINTING PURPOSE | NORMAL PRINTING | DOCUMENT PRINTING | PAPER-SAVED PRINTING | SNAPSHOT PRINTING |
|---|---|---|---|---|
| TYPE OF PAPER | PLAIN PAPER | PLAIN PAPER | PLAIN PAPER | GLOSSY PHOTO PAPER |
| PAPER SIZE | A4 | A4 | A4 | L |
| PRINT QUALITY | STANDARD | STANDARD | STANDARD | CLEAR |
| BORDERLESS FULL-SURFACE PRINTING | OFF | OFF | OFF | ON |
| CLEAR PROCESSING | OFF | OFF | OFF | ON |
| ALLOCATION PRINTING | OFF | OFF | ON (2 in 1) | OFF |
| BOTH-SIDE PRINTING | OFF | ON | ON | OFF |
| COPY UNIT | OFF | OFF | ON | OFF |
| MONOCHROME PRINTING | OFF | OFF | ON | OFF |
| . | . | . | . | . |
| . | . | . | . | . |
| . | . | . | . | . |

FIG.6

| NORMAL PRINTING | DOCUMENT PRINTING | PAPER-SAVED PRINTING | SNAPSHOT PRINTING |
|---|---|---|---|
| BORDERLESS FULL-SURFACE PRINTING | PRINTING BY 2 IN 1 | PRINTING BY 2 IN 1 | BORDERLESS FULL-SURFACE PRINTING |
| PRINTING BY 2 IN 1 | PRINTING BY 4 IN 1 | PRINTING BY 4 IN 1 | CLEAR PROCESSING |
| PRINTING BY 4 IN 1 | BOTH-SIDE PRINTING | BOTH-SIDE PRINTING | MONOCHROME PRINTING |
| BOTH-SIDE PRINTING | COPY UNIT | COPY UNIT | |
| COPY UNIT | MONOCHROME PRINTING | MONOCHROME PRINTING | |
| MONOCHROME PRINTING | FAST | LOW RESOLUTION | |

INFORMATION PROCESSING APPARATUS, AND PRINTING CONTROL METHOD FOR DISPLAYING SCREEN FOR SETTING VALUES

CROSS REFERENCE OF RELATED APPLICATIONS

This application is a Continuation of U.S. patent application Ser. No. 12/558,405 filed on Sep. 11, 2009 which claims the benefit of Japanese Patent Application No. 2008-291106 filed Nov. 13, 2008, which is hereby incorporated by reference herein in its entirety

BACKGROUND OF THE INVENTION

1. Field of the Invention

The present invention relates to a method for controlling print setting, and a control method therefor.

2. Description of the Related Art

When a host computer instructs a printer to perform printing, various items regarding printing, such as a type and a size of paper, the number of prints, and a layout, can be set by using a printer driver installed in the host computer.

In a user interface (UI) disposed in such a printer driver, in many cases, setting items regarding printing are categorized into a tab format as illustrated in FIGS. 3A and 3B. For example, a tab 301 in FIG. 3A integrates setting items such as a type of paper 303 and a color adjustment 304 that relate print quality, and a tab 302 in FIG. 3B integrates setting items such as a size of paper 305 and a direction 306 that relate a page layout.

Categorizing the setting items into a plurality of tabs enables checking of functions provided by the printer driver while collating them with function fields to which they belong. As a result, a user who is not accustomed to the printer driver can understand the functions.

Additionally, a user knowledgeable about functions themselves but unaccustomed to the user interface of the printer driver can approximately guess a place where a setting changing unit of the functions is disposed.

The method is not limited to that described above, and items may be further categorized into a basic setting group and an application setting group, and arranged in a hierarchical manner.

Print setting in an initial status where the printer driver is installed (setting at the time of shipping) is preset to a frequently used combination or a combination for exhibiting printer performance in a balanced manner.

Thus, to prepare for a case where the user wishes to constantly apply setting that is different from the initial setting, an operating system (OS) such as Windows (registered trademark) 2000, XP, or Vista provided by Microsoft Corp., based on a multi-user environment has a function of storing a desired setting combination as default setting for each user account.

When application software gives a printing instruction, the application software changes setting for necessary items, and issues a printing job by directly using default print setting information obtained from the printer driver for other setting items.

Thus, the storage of setting desired by the user as default setting for the items that is not changed by the application software by using the function of the OS enables saving time and labor for changing setting for each printing, greatly improving efficiency of printing work.

In the conventional user interface categorizing the setting items, types of setting items belonging to categories are constant, and many items are set for dealing with various printing purposes. On the other hand, functions that the user wishes to use are generally limited to some specific items for each printing purpose.

For example, when wishing to make quick and easy checking, an entire content of a document is printed with "draft quality" and "4-page allocation setting". When wishing to print a snapshot, the printing is performed with setting such as "paper type for photo", "paper size for photo", and "borderless".

In many cases, therefore, a desired setting item has to be found among many items, and a tab has to be switched to set items when desired items belong to a plurality of categories.

When items are arranged in a hierarchical manner based on a dependant relationship among settings, the items have to be set in order from a high class. Thus, this operation unit is not necessarily easy to use.

Under these circumstances, a user interface customizing method that displays only setting items selected by a user has been developed.

Another method has been developed, which uses a function of the OS for storing setting to be used at the moment as default setting in the user account. Thus, time and labor for changing setting for each starting of the application software to perform printing can be saved.

However, when there is a plurality of combinations of frequently used print settings, in other words, a plurality of printing purposes, default setting has to be changed beforehand each time a printing purpose changes, or setting has to be changed to desired print setting for a specific print item after a start of the application software.

Thus, for example, as discussed in Japanese Patent Application Laid-Open No. 2000-222159, printer drivers that have own functions of storing a plurality of presets (patterns) of combinations of desired print settings have widely been marketed.

Desired print settings can be applied altogether only by selecting and reading one of the presets stored beforehand after the user interface of the printer driver is loaded from the application software.

As a result, as long as presets can be stored for all the assumed printing purposes, the aforementioned problem can be solved.

However, it is only direct use of one of the combinations of stored prescribed values that is effective for reducing complexity of an operation. In other words, in the case of an unexpected printing purpose or special printing, to make a certain change from a prescribed value stored as a preset, a user must change desired setting by switching a tab or a hierarchy while being aware of a category.

If there is a possibility of using a result of partly changed settings, each combination of setting values after the change has to be stored. As a consequence, a complex operation cannot be eliminated.

When the user interface (UI) is customized to display only setting items selected beforehand by the user, even if items to be changed belong to a plurality of categories, desired printing can be set by a relatively small number of operation steps.

Generally, however, setting items that the user wishes to change vary depending on printing purposes. When the user interface is customized to deal with all the purposes, each time printing is carried out, many unnecessary setting items for the printing purpose are displayed. As a consequence, the user has to perform complex setting.

SUMMARY OF THE INVENTION

The present invention is directed to an information processing apparatus and a printing control method in which a user can set a desired print setting value according to a printing purpose, and easily check and set setting items needed regardless of a printing purpose by a small number of operation steps.

According to an aspect of the present invention, an information processing apparatus for setting a setting value for print data transmitted to a printer, includes a selection unit configured to select one from a plurality of printing purposes, and a display unit configured to display a screen for setting the setting value of the print data including a variable setting item for setting one from a plurality of setting values associated with the printing purpose selected by the selection unit and a fixed setting item nondependent on any printing purpose. In this case, setting values of the variable setting item and the fixed setting item are set by different setting ways on the displayed screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a preset associated with a printing purpose according to an exemplary embodiment of the present invention.

FIG. 6 illustrates an example of variable setting items corresponding to each printing purpose according to an exemplary embodiment of the present invention.

DESCRIPTION OF THE EMBODIMENTS

Various exemplary embodiments, features, and aspects of the invention will be described in detail below with reference to the drawings.

Figure 1:
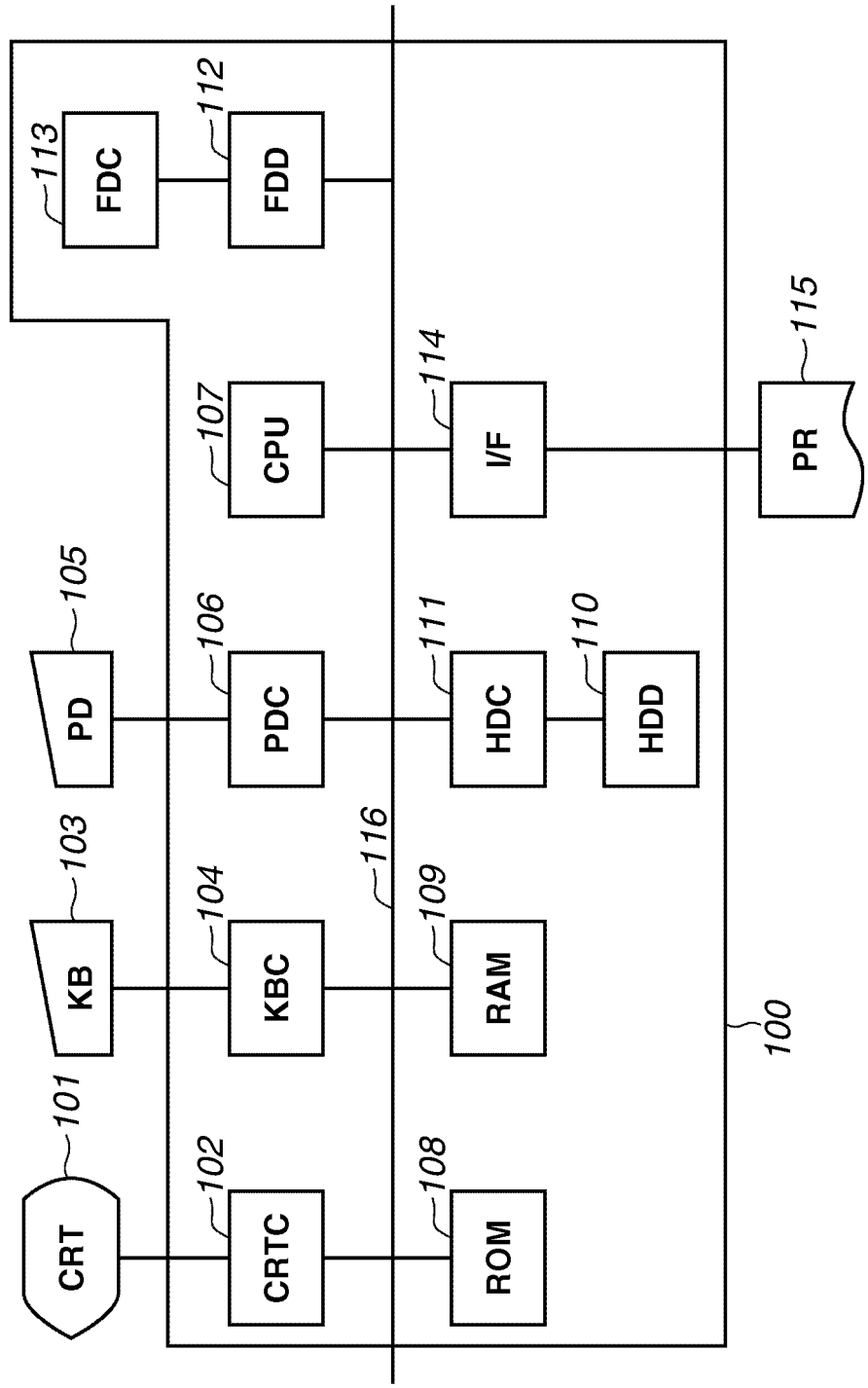
FIG. 1 is a block diagram illustrating a configuration of a host computer as an example of an information processing apparatus connected to a printer in a printing system according to an exemplary embodiment of the present invention.

FIG. 1 is a block diagram illustrating a hardware configuration of a printing system according to an exemplary embodiment of the present invention.

In FIG. 1, an information processing apparatus (host computer) 100 that has an application for giving a printing instruction.

A CRT 101 is a CRT display device for displaying a print setting dialog or printer status information provided by a printer driver. A CRTC 102 controls the display device. A KB 103 is a data input device including a keyboard. A KBC 104 is a keyboard controller for controlling the keyboard KB 103.

A coordinate input device 105 includes a pointing device. A pointing device controller 106 controls the pointing device or the like.

A CPU 107 performs overall control of the information processing apparatus. A ROM 108 stores a boot program or the like. A RAM 109 is used for storing an OS, each application program, and a printer driver program, and even as a work area.

A hard disk drive 110 stores the OS, each application program, the printer driver program, and font data, and temporarily stores a spool file. The information processing apparatus includes a hard disk controller 111.

A floppy (registered trademark) disk drive 112 drives a portable storage medium. The information processing apparatus includes a floppy disk controller 113. An interface 114 is connected to a printer 115 such as an ink-jet printer via an interface cable. A bus 116 interconnects the devices.

When power is turned ON for the information processing apparatus, the CPU 107 starts according to the boot program stored in the ROM 108, and loads the OS from the hard disk drive 110 to wait for user's operation.

Upon reception of a printing instruction or an instruction of changing print setting of the printer driver from the user by the KB 103 or the PD 105 via an application, the printer driver program stored in the hard disk drive 110 is loaded to the RAM 109 and executed.

In the case of setting where the printer driver is automatically started, the printer driver program stored in the hard disk drive 110 is loaded to the RAM 109 and executed.

Figure 2:
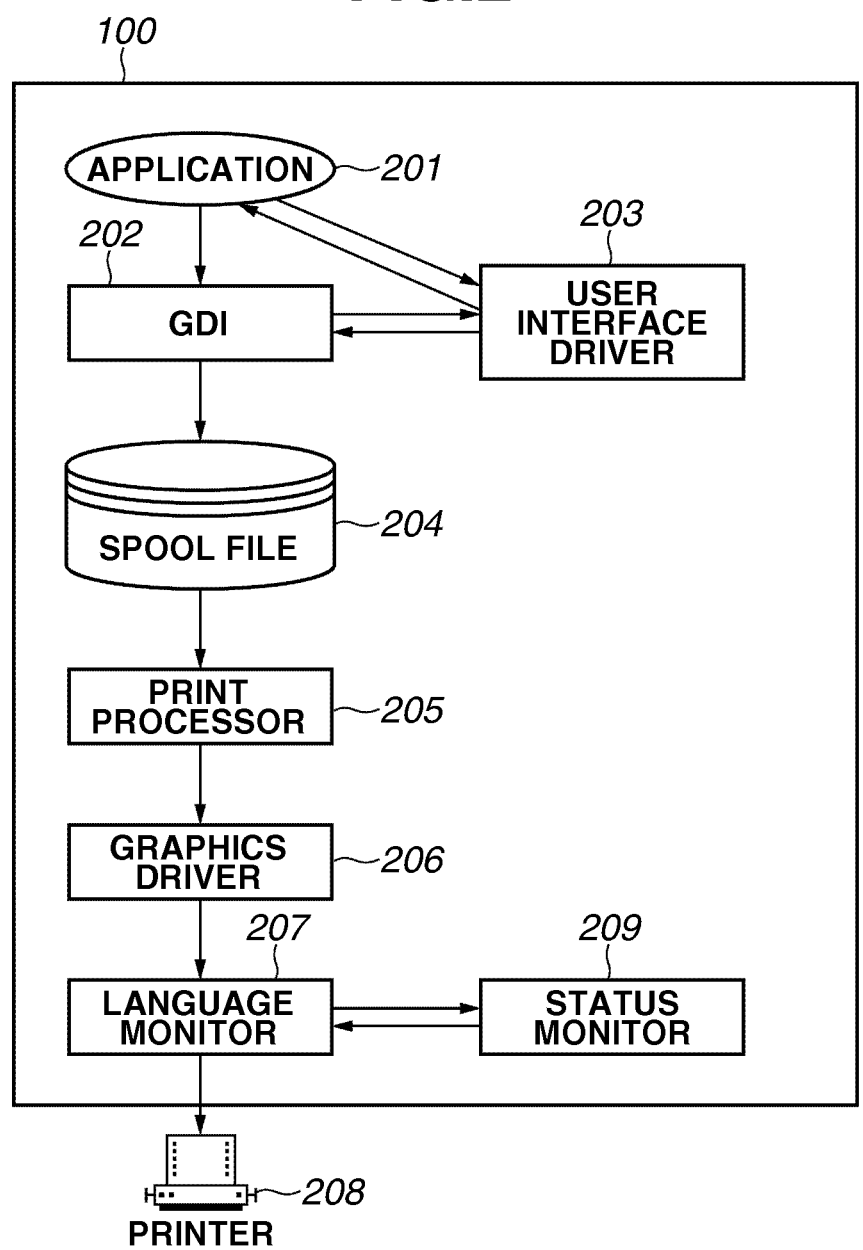
FIG. 2 is a block diagram illustrating a configuration of software (mainly a printer driver) of the printing system according to an exemplary embodiment of the present invention.
Figure 3A:
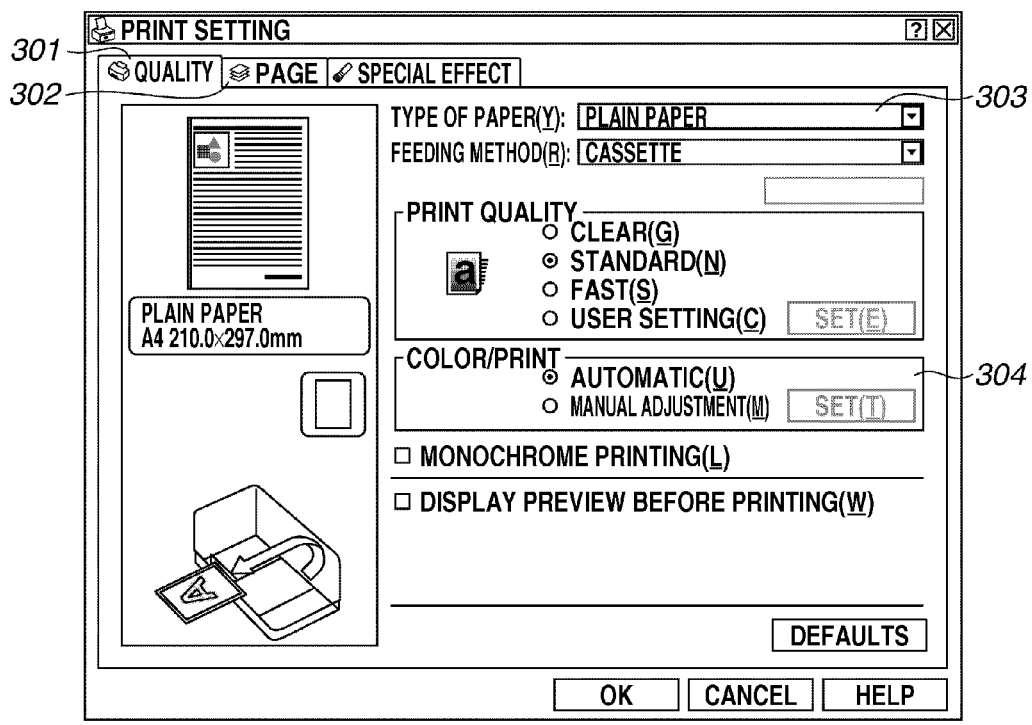
FIGS. 3A and 3B illustrate examples of conventional user interfaces for print setting to which the present invention is not applied.
Figure 3B:
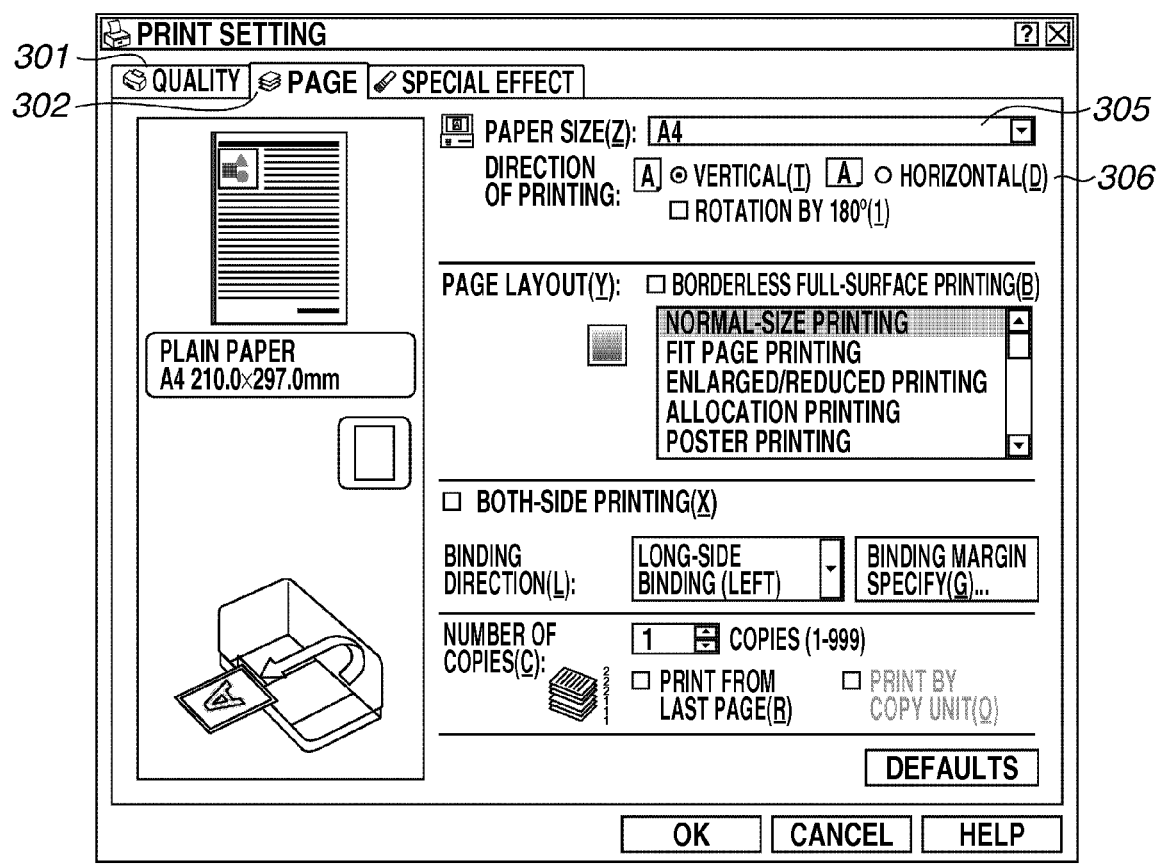

FIG. 2 is a block diagram illustrating a configuration of software (mainly printer driver) of the printing system according to an exemplary embodiment of the present invention.

In FIG. 2, an information processing apparatus (host computer) 100 corresponding to the information processing apparatus (host computer) 100 in FIG. 1 illustrates units included in the host computer. For processing regarding printing and print setting changing in exemplary embodiments, which is described below, provided by components other than a spool file 204 and a printer 208, a program necessary for the processing is loaded to the RAM 109 to be realized. The spool file 204 is generally generated in the hard disk drive 110 during printing execution.

First, an application 201 creates a document, and makes an inquiry about a function of a printer system to a user interface driver 203. The application 201 notifies the printing system, which includes a GDI 202 of the operating system, of a printing start.

The GDI 202 that has been notified of the printing start by the application 201 notifies the user interface driver 203 of a printing event of the printing start by the application 201.

The application 201 supplies print data of the document to be printed to the GDI 202 and continues the print processing. The print data passed through the GDI 202 is stored in the spool file 204.

A print processor 205 reads the print data from the spool file 204, and the print data is sent to a language monitor 207 via a graphics driver 206. The language monitor 207 transmits the print data to the printer 208 while performing two-way communication with the printer 208.

The language monitor 207 receives information of a status held by the printer 208 as needed. The language monitor 207 communicates a current status of the printer or printing to a status monitor 209 based on the information received from the printer or the print data to be transmitted. The status monitor 209 displays the status.

The status printer 209 not only displays the status of the printer or the printing, but also provides, when the printing is interrupted for one reason or another, coping options to the user, and receives a response from the user and transmits it to the language monitor 208.

Some exemplary embodiments of a printing control method will be described below. The configuration described above referring to FIGS. 1 and 2 are in common with the following examples. First, information that is stored in the printing system in advance is described.

Figure 4:
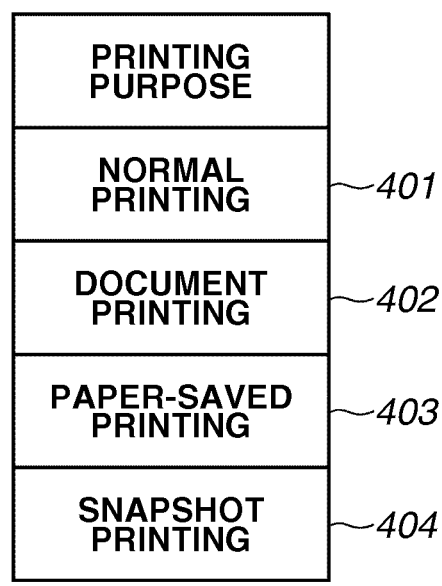
FIG. 4 illustrates an example of printing purposes according to an exemplary embodiment of the present invention.

FIG. 4 illustrates an example of one or more printing purposes: four examples of "NORMAL PRINTING", "DOCUMENT PRINTING", "PAPER-SAVED PRINTING", and "SNAPSHOT PRINTING".

The "NORMAL PRINTING" 401 is used for printing where printer performance is set in a balanced manner so that a small number of failures may occur. The "DOCUMENT PRINTING" 402 is used for outputting a document, which includes mainly characters, assuming a case of placing greater importance on a printing speed than on print quality, and a case of integrating a great deal of information in one piece of paper.

The "PAPER-SAVED PRINTING" 403 is similar to the "DOCUMENT PRINTING", but clearly intended to reduce the number of sheets by integrating a great deal of information on one piece of paper. The "SNAPSHOT PRINTING" 404 is used for clear printing having no margin in general high-grade paper of a picture size.

FIG. 5 illustrates an example of combinations of a setting item and a setting value (a predetermined value) associated with each of the printing purposes. The prescribed value is a print setting value considered suitable for achieving the printing purpose.

FIG. 6 illustrates an example of setting values in variable setting items according to each printing purpose. For each of the variable setting items, a setting value likely to be frequently designated by the user even after selection of a printing purpose is prepared beforehand. The variable setting items are configured to determine a status by selecting "valid/invalid" based on user's instruction described below referring to FIG. 8.

The variable setting items may be used for changing the predetermined values associated with each of the printing purposes illustrated in FIG. 5, or for simply setting set setting values other than predetermined values.

Figure 7:
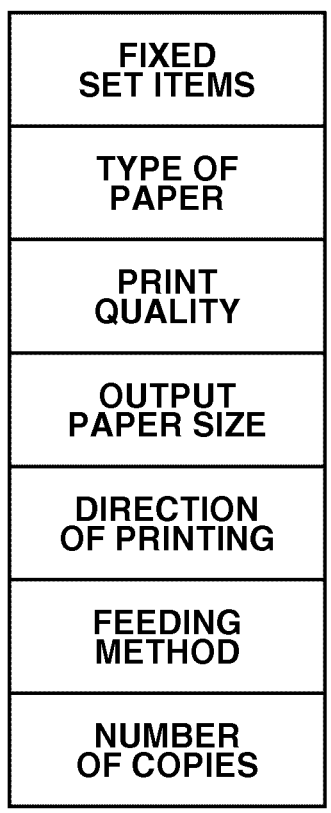
FIG. 7 illustrates an example of fixed setting items according to an exemplary embodiment of the present invention.

FIG. 7 illustrates printing setting items (fixed setting items) fixedly prepared for all the printing purposes. A plurality of fixed setting items are not dependent on any printing purpose. In other words, the fixed setting items are items associated with the purposes and greatly affect printing results, and thus must be always checked for set contents.

Figure 8:
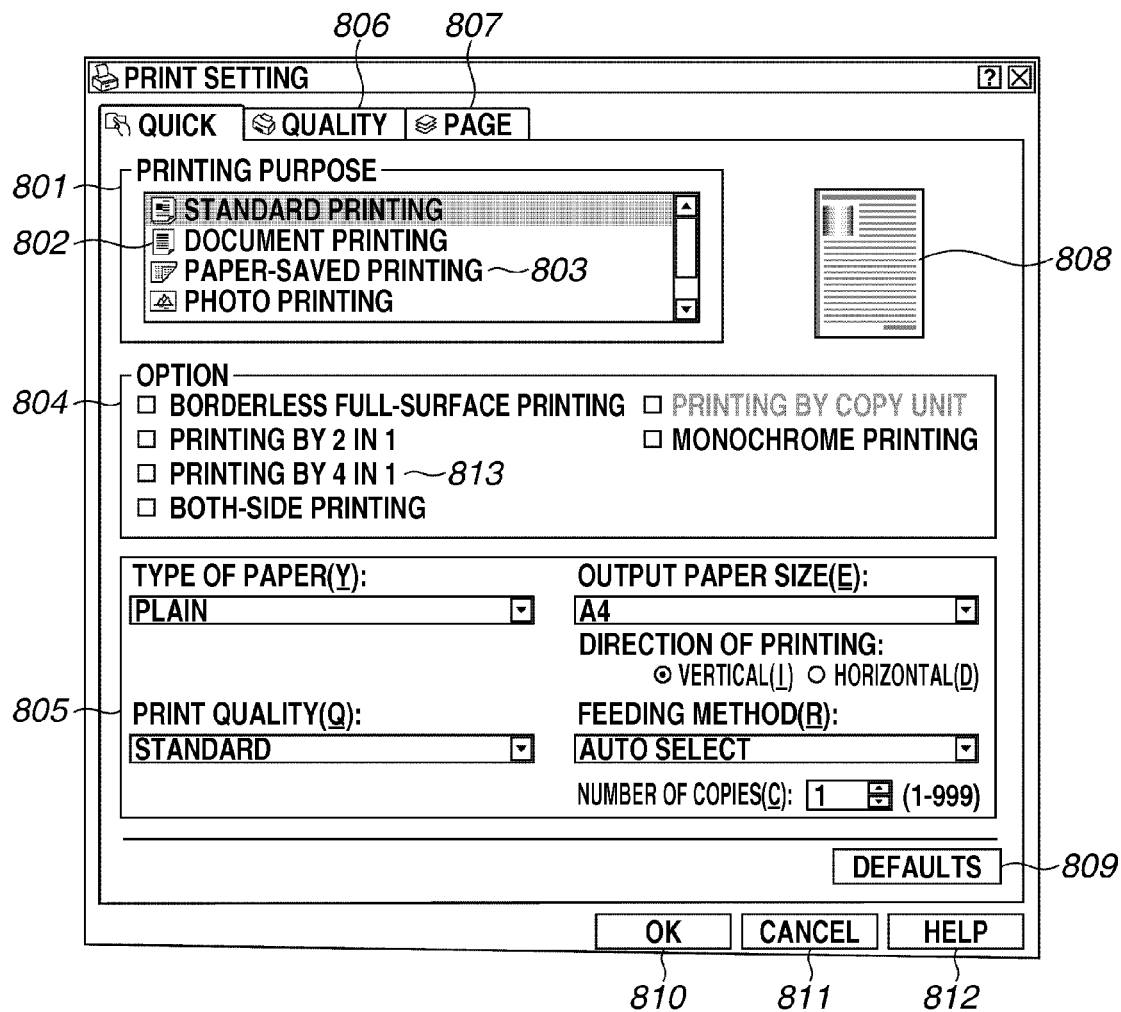
FIG. 8 illustrates an example of a user interface for print setting according to an exemplary embodiment of the present invention.

FIG. 8 illustrates an example of a user interface (UI) in the printing system of the present invention that holds the information described above.

In a printing purpose section 801, printing purposes are displayed, and one of the printing purposes can be selected based on an instruction input by the user. A display example of an icon 802 shows a content of each printing purpose. A name 803 is set for each printing purpose.

An area 804 (option setting area) displays and sets each settable setting value in the variable setting items associated with the printing purpose selected in the printing purpose section 801.

An area 805 displays and sets a fixed setting value not associated with any printing purpose, in other words, not changed even when any one of the printing purposes is selected. In this case, a plurality of fixed setting items are displayed.

A tab 806 displays setting items regarding quality of a print output, and a tab 807 displays setting items regarding a page layout for printing. These tabs are used for switching various detailed print settings including setting items set in the areas 804 and 805.

A set view area 808 enables graphical checking of currently set contents, mainly setting of a page layout. This displaying enables the user to preview an output status based on settings of the sections 801, 804 and 805.

A button 809 is used for returning current setting to a status at the time of shipping. A setting completion button 810 is used for completing a printing setting operation. A button 811 is used for canceling a print setting operation currently performed by the user. A button 812 is used for calling helps describing operations and functions.

The displaying in the area 804 employs a form of a check box where valid/invalid of relevant function is switched by giving a check mark.

For example, in the case of the conventional printer driver, a "PRINTING BY 4 IN 1" FUNCTION 813 is set by selecting "ALLOCATION PRINTING" that is an item on the setting screen designated by the page setting tab. The "PRINTING BY 4 IN 1" function is a function for allocating 4 logical pages to one piece of paper (physical page).

Figure 9:
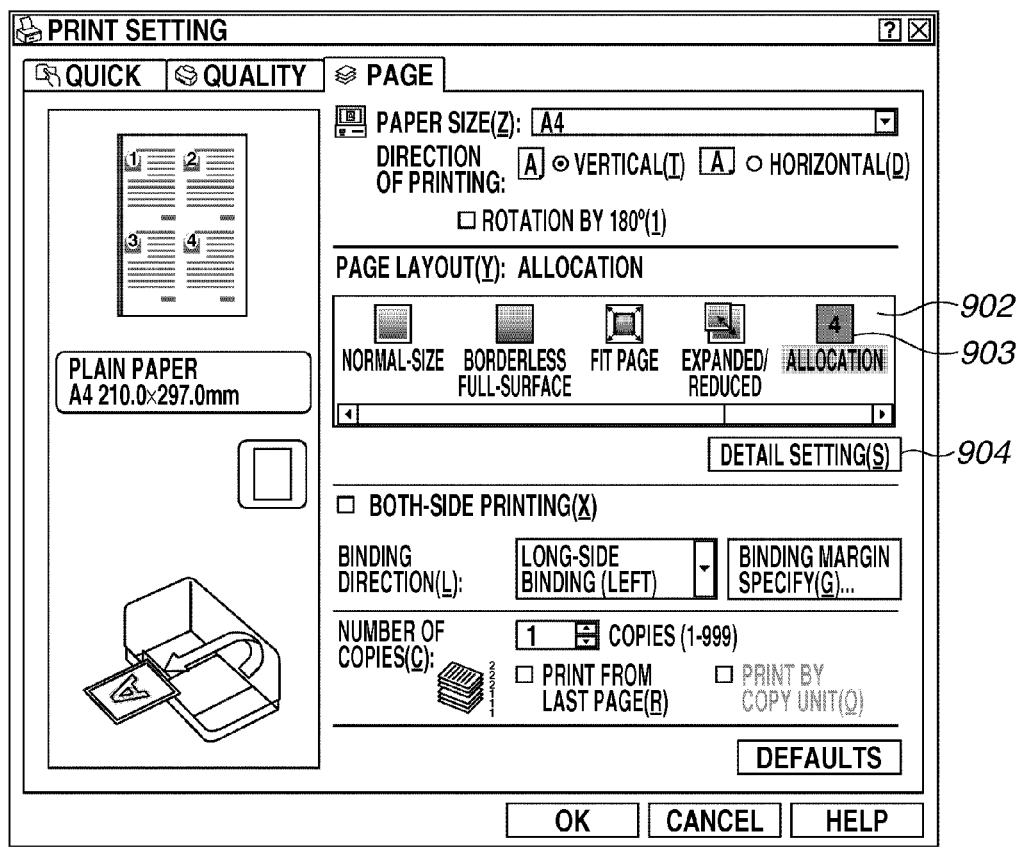
FIG. 9 illustrates an example of setting allocation printing in the conventional user interface to which the present invention is not applied.
Figure 10:
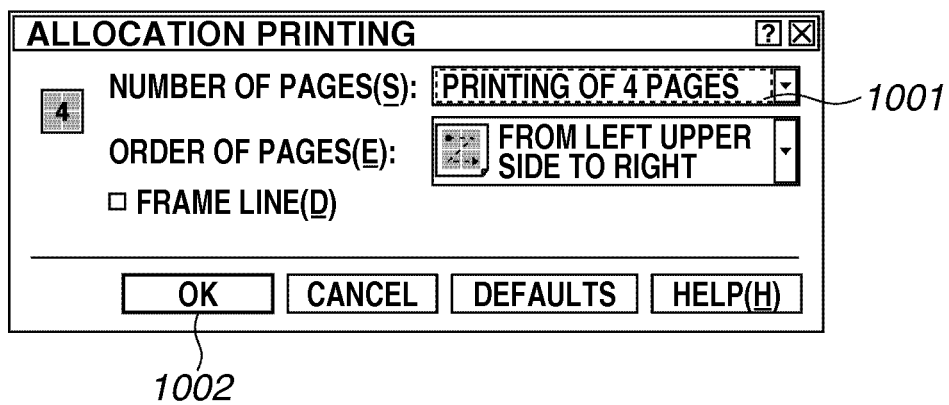
FIG. 10 illustrates an example of setting printing of "4 in 1" in the conventional user interface to which the present invention is not applied.

FIG. 9 illustrates an example of a user interface similar to a conventional user interface. A user selects a page setting page 807 to display a setting screen. When the user selects "ALLOCATION PRINTING" 903 in a layout selection area 902, a detail-setting button 904 becomes valid. When the user pressed this button, an allocation printing detail setting screen of FIG. 10 is displayed.

The user can designate the number of logical pages to be allocated to one sheet in an area 1001. When the user selects "4-PAGE PRINTING" to determine in a box 1002, setting of the "4-PAGE PRINTING" function is completed.

On the other hand, in the user interface of the printing system of the present invention, the user can complete setting of the function only by checking the check box of the "PRINTING BY 4 IN 1" function 813.

The setting method of the variable setting items prepared corresponding to the printing purposes employs the checking method. It is because functions that the user uses subsequently for each selected printing purpose are substantially predetermined.

When setting is performed for selectively designating print settings among the allocation print setting items of the layout setting such as the "PRINTING BY 4 IN 1" or the "PRINTING BY 2 IN 1" shown in FIG. 8, a setting screen is employed to enable selection from a list by the checking method without using any hierarchical structure. This way, for setting values frequently used according to printing purposes, the user can be explicitly notified of candidates, and the checking method can provide a simpler setting method having a small number of operation steps.

As illustrated in the area 804, even setting values for monochrome printing and both-side printing, for example, which are designated by using different print setting items in the conventional printer driver, are provided as setting values as variable setting values for enabling the user to perform easy setting.

The setting method for a setting value of each fixed setting item displayed in the area 805 is set using a pull-down menu. It is because the setting item is common for all the printing purposes, and a setting value of each item cannot be uniquely determined according to a printing purpose. Thus, as an efficient setting method that can handle various printing purposes, the form of the pull-down menu is employed.

Thus, according to the present invention, the variable setting items and the fixed setting items are clearly distinguished from each other on the UI, and the setting ways are different from each other in consideration of how the user uses the items.

The setting values included in the fixed setting items may be included as setting values in the variable setting items. In this case, setting values registered, as they are likely to be frequently used according to printing purposes in the variable setting items, correspond to setting values in the fixed setting items. Even in such a case, the setting values can be set by using the checking method, and hence it is highly convenient for users.

When a setting value is set (checked) in the area 804, in the area 805, a corresponding setting value of the fixed setting items is automatically reflected. When the setting value is selected in the area 805, the corresponding value in the area 804 is automatically reflected (checked).

Figure 20:
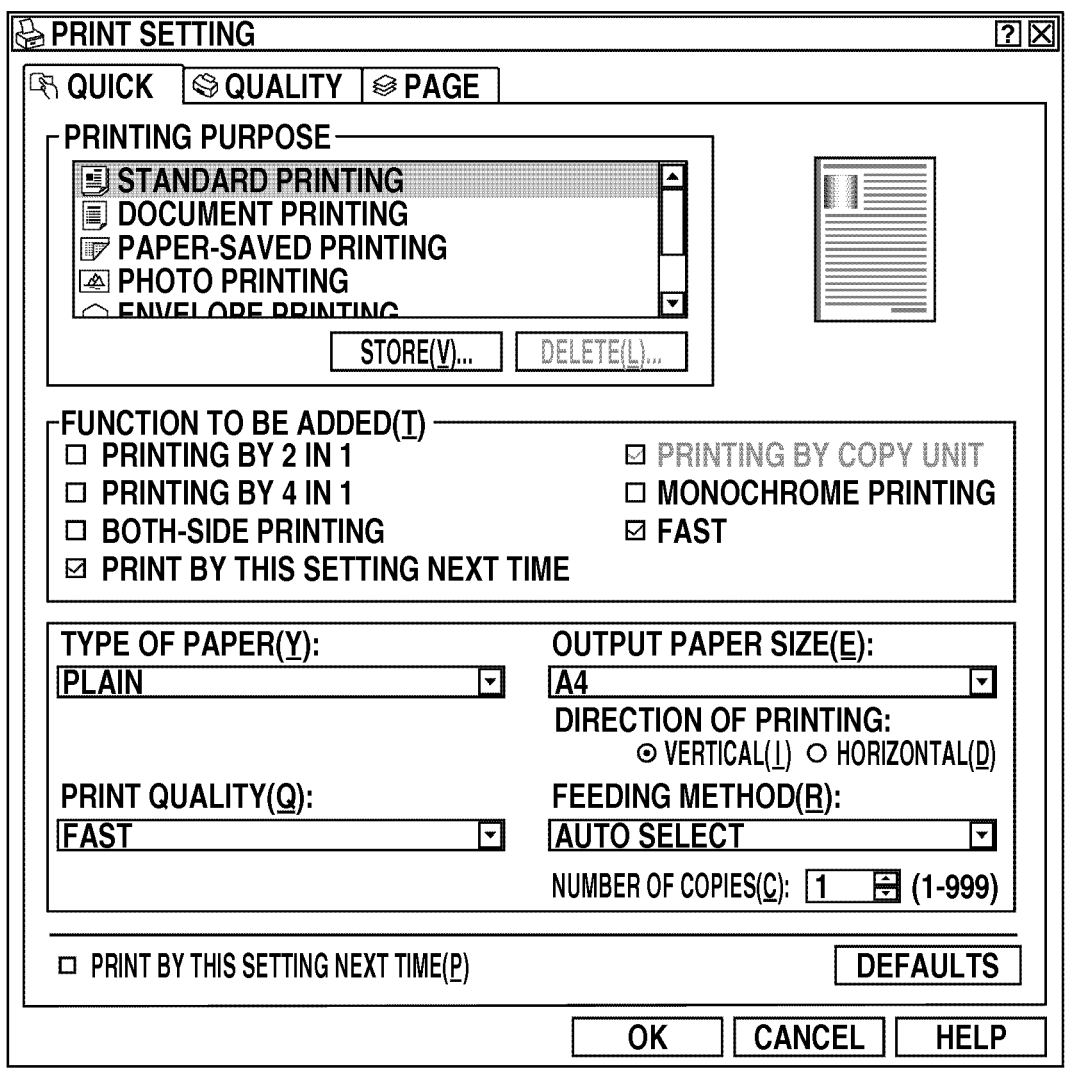
FIG. 20 illustrates another display example of the user interface illustrated in FIG. 8 according to an exemplary embodiment of the present invention.

FIG. 20 illustrates an example of a display screen in the above case. In the example, a setting value "FAST" corresponds to "PRINT QUALITY" of a print setting item.

Figure 11:
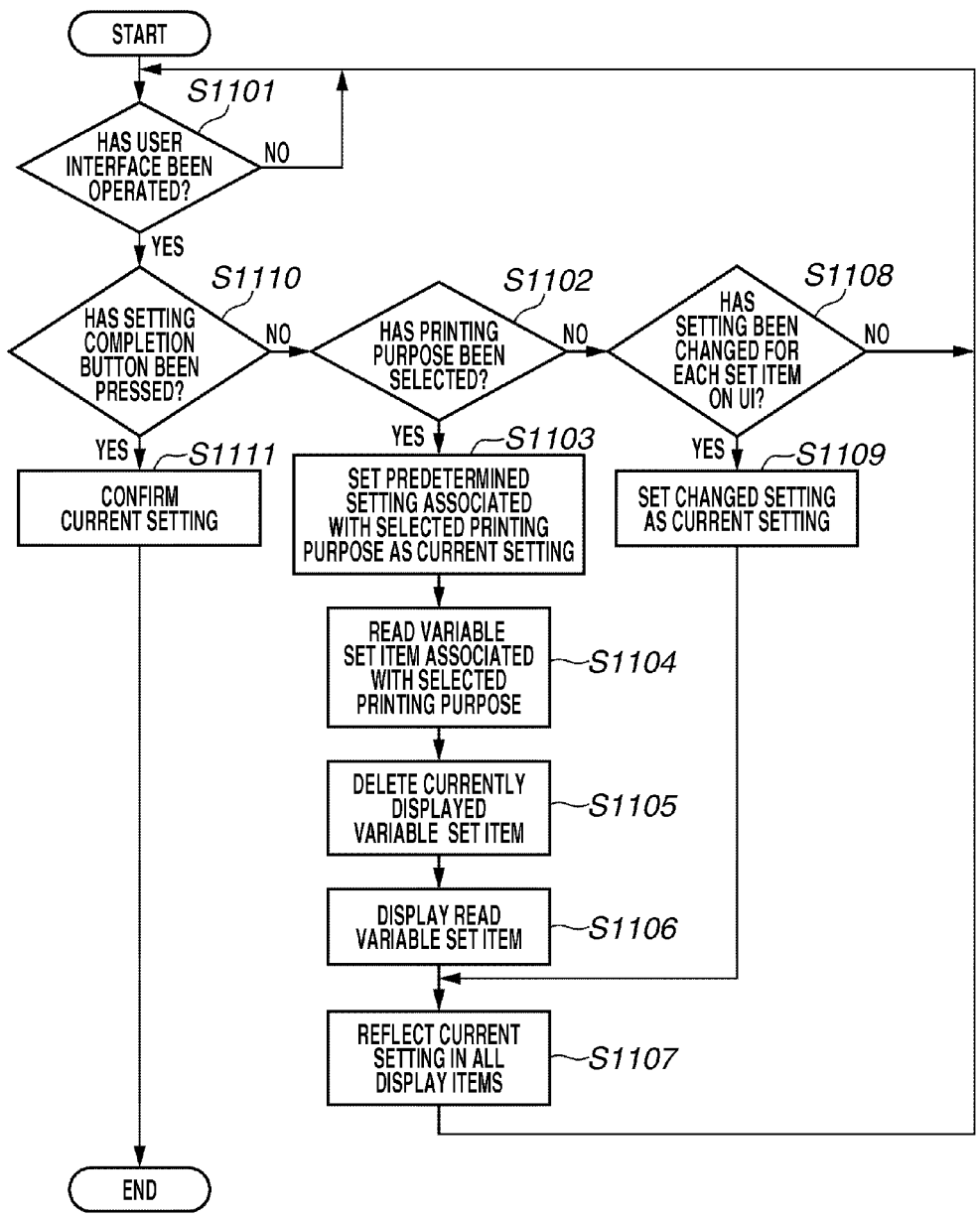
FIG. 11 is a flowchart illustrating control when print setting is performed according to an exemplary embodiment of the present invention.

Referring to a flowchart of FIG. 11, processing of the user interface driver 203 operated in the host computer 100 of the present invention will be described.

In step S1101, the user interface driver 203 determines whether a user operation has been performed for the UI illustrated in FIG. 8. More specifically, upon detection of an event where the user has performed a certain operation on the UI, the user interface driver 203 determines that a user operation has been performed.

Determination of the processing described below is made by analyzing the detected event. The user interface driver 203 stands by until a user operation is performed on the UI (NO in step S1101), and the processing proceeds to step S1110 when a certain user operation is performed (YES in step S1101).

In step S1110, the user interface driver 203 determines whether a setting completion button has been pressed. If the setting completion button has been pressed (YES in step S1110), the processing proceeds to step S1111. If the setting completion button has not been pressed (NO in step S1110), the processing proceeds to step S1102.

In step S1102, the user interface driver 203 determines whether a printing purpose has been selected. If a printing purpose has been selected (YES in step S1102), the processing proceeds to step S1103. If no printing purpose has been selected (NO in step S1102), the processing proceeds to step S1108.

In step S1103, the user interface driver 203 reads a predetermined printing setting preset associated with the selected printing purpose, and sets it as current print setting.

In step S1104, the user interface driver 203 reads a variable setting item associated with the selected printing purpose. In step S1105, the user interface driver 203 deletes displaying of the currently displayed variable setting item. In step S1106, the user interface driver 203 controls displaying of an area for performing setting regarding the variable setting item associated with the read printing purpose. As a result, a setting screen is displayed on the UI according to the printing purpose.

In step S1107, contents of the current print setting are reflected in all the setting items on the UI of the printer driver including the variable and fixed setting items. In this case, when there is a function unchangeable under the current setting, invalid display (graying-out) is executed to inhibit reception of an operation input regarding its setting item.

In step S1108, the user interface driver 203 determines whether the user has changed setting for each setting item on the UI. In this case, the user interface driver 203 determines whether setting changing has been instructed for the variable setting item or the fixed setting item.

If the user has changed setting (YES in step S1108), the processing proceeds to step S1109. If the user has not changed any setting (NO in step S1108), the user interface driver 203 performs predetermined processing based on an operation such as tab switching other than setting changing, and the processing returns to step S1101.

In step S1109, the user interface driver 203 determines validity of coexistence of a setting change with another setting based on user's operation. If there are setting values that cannot coexist, the user interface driver 203 provides a UI for making inquiries to the user. Upon reception of a setting change instruction via user's UI, the user interface driver 203 corrects the setting to print setting constituted of setting values that can coexist.

For this correction, processing for invalidating the setting change or substituting it with another setting value that will bring about an approximate printing result may be automatically performed. The user interface driver 203 sets the print setting enabling coexistence as current setting to proceed to step S1107.

In step S1111, the user interface driver 203 confirms the current setting based on the operation performed on the user interface and then the processing ends.

According to the exemplary embodiment, rough print setting is implemented according to a printing purpose selected among a plurality of printing purposes. Then, according to the selected printing purpose, items for setting functions necessary for the user are integrated on one setting screen.

The configuration enables great reduction of the number of user's operation steps as compared with the UI of the printer driver having setting items disposed discretely over a plurality of conventional setting screens.

Setting items are separated into variable setting items and fixed setting items to be integrated according to the printing purpose and displayed in specific areas, and setting methods are different between variable setting items and fixed setting items. This configuration clarifies presence of a fixed setting item that greatly affects a printing result in any printing purpose, thereby preventing the setting from leaving unchanged.

For the variable setting item likely to be used subsequently by the user for each printing purpose, the method for setting its setting value from a list by checking is employed. As a result, the user can be easily notified of each setting of a significant function, and setting can be performed by a smaller number of operation steps.

Figure 12:
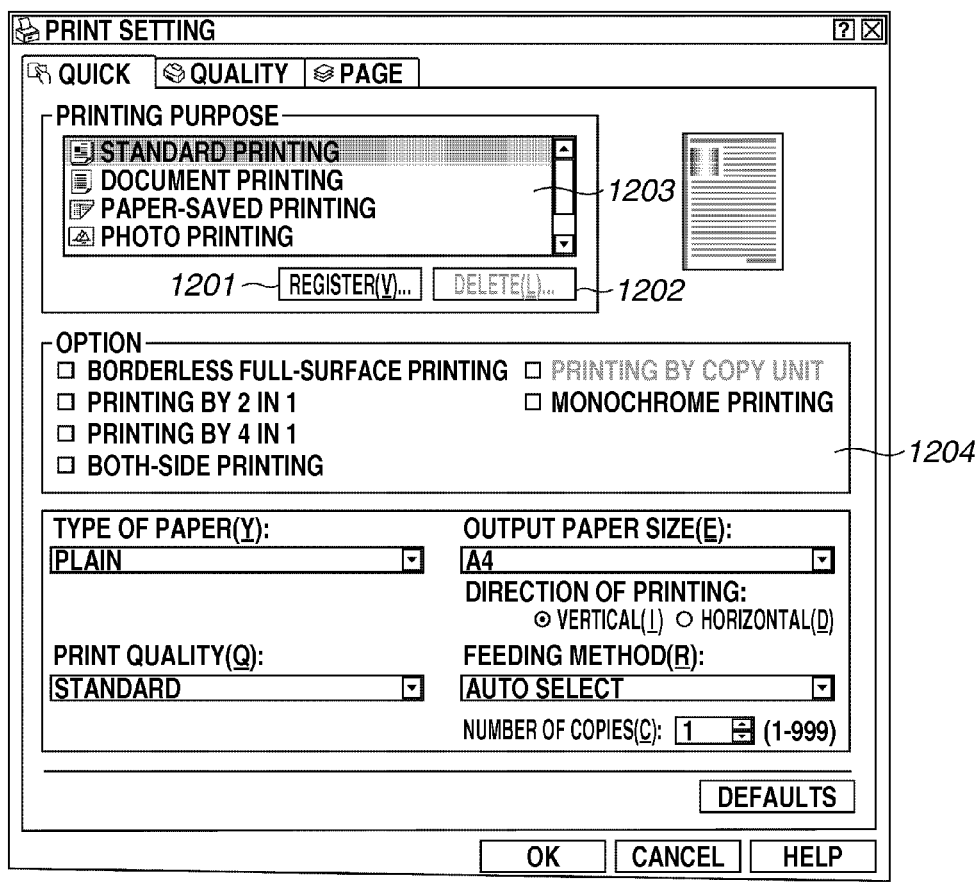
FIG. 12 illustrates an example of a user interface for print setting according to a second exemplary embodiment of the present invention.

FIG. 12 illustrates an example of a configuration of a user interface that can add/delete printing purposes in the printing system of the first exemplary embodiment.

Figure 13:
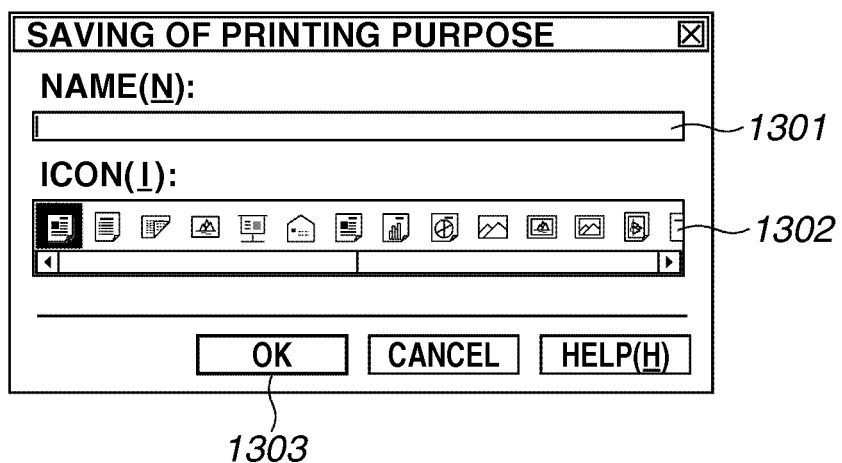
FIG. 13 illustrates an example of a user interface used for registering a printing purpose according to the second exemplary embodiment of the present invention.

When wishing to add current setting on the UI as a preset after a setting change is performed according to a new printing purpose, if a register button 1201 is pressed, a window of FIG. 13 is displayed. A name 1301 of an added printing purpose and an icon 1302 of the added printing purpose are selected and then a set button 1303 is pressed.

Then, the printing purpose associated with the current setting is added as a printing purpose to be newly managed by a printer driver. A variable setting item displayed in an area 1204 of a current user interface is associated with the printing purpose.

After then, the printing purpose is displayed in an area 1203. The variable setting item associated with the printing purpose may be optionally selected from setting values of print setting items supported by the printer driver by a user.

When a delete button 1202 is pressed, the printing purpose currently displayed in the area 1203 is deleted. The deleted printing purpose generally releases a useless storage area, and hence the printing purpose is preferably deleted together with all pieces of information regarding printing purposes held by the printer driver. However, it is not limited to that. The deleted printing purpose should not be displayed in at least the area 1203 for selecting a printing purpose.

According to the exemplary embodiment, convenience is improved because a combination of optional print settings is added and stored as a new printing purpose, which can be subsequently read and used easily. Furthermore, implementing this embodiment in the printing system of the present invention provides easiness of setting change, no feelings of complexity, and high visibility of setting list for reading of settings uniquely added by the user.

In a third exemplary embodiment, when certain setting change made for a predetermined value according to a selected printing purpose is not included in the variable setting items on the UI in the first exemplary embodiment, the setting value is newly added to the variable setting item.

Figure 14:
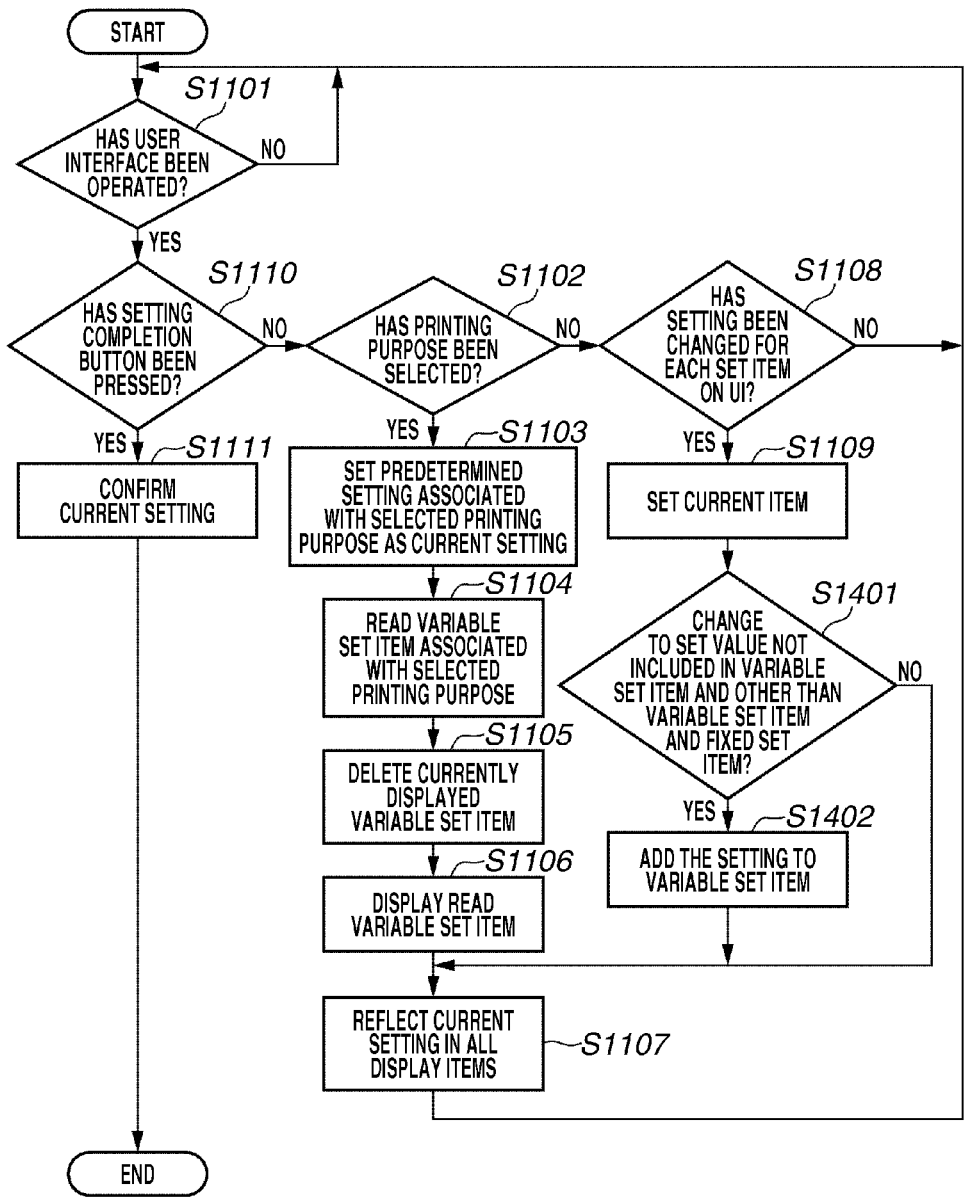
FIG. 14 is a flowchart illustrating control when print setting is performed according to a third exemplary embodiment of the present invention.

FIG. 14 is a flowchart illustrating processing of a user interface driver 203 according to the exemplary embodiment.

Steps S1401 and S1402 that are differences from the processing of the first exemplary embodiment illustrated in FIG. 11 will be described. Other processing steps are similar to steps S1101 to S1111 of FIG. 11.

In step S1401, the user interface driver 203 determines whether a setting change in a determination result of step S1108 is performed by changing from other than variable setting items and fixed setting items and not included as setting values of the variable setting item.

If the setting change is performed by changing from other than the variable setting items and the fixed setting items and not included as setting values of the variable setting items, the processing proceeds to step S1402. Otherwise, the processing proceeds to step S1407.

In step S1402, the user interface driver 203 additionally displays the setting value set by the setting change in the determination result of step S1108 as a setting value of the variable setting item corresponding to a currently selected printing purpose. Simultaneously, a printer driver stores the setting value in association with the variable setting item.

Thereafter, even when the currently selected printing purpose is selected again, the user interface driver 203 displays the newly associated setting value in a display area of the variable setting item. Upon completion of the processing, the processing proceeds to step S1407.

The setting value processed in steps S1401 and S1402 may not be set as print setting. Hence, in step S1413, when print setting is established, the setting value may be stored in association with the variable setting item.

In the above configuration, to deal with a case where no new item can be added to display in the display area of the variable setting item, the number of times of using the variable setting item may be counted, and a setting value of a number of using times may be changed not to be displayed when display items reach saturation. Alternatively, when the display items reach saturation, the user may select setting values not to be displayed.

Setting change, which is performed in step 1401 from other than the variable setting items and the fixed setting items, is performed when the user indicates a setting value via the setting screen illustrated by tab 806 and tab 807.

According to the exemplary embodiment of the invention, the setting value changed by the user from other than the variable setting items and fixed setting items can be set easily next time.

In place of addition of a new printing purpose as described in the configuration of the second exemplary embodiment, a function for storing one combination of desired setting values as default setting (default registration) for each user account of an OS. In this case, use of the stored default setting during printing from another application is checked by a user. Hereinafter, the default setting stored for each user account is referred to as a user default.

Figure 15:
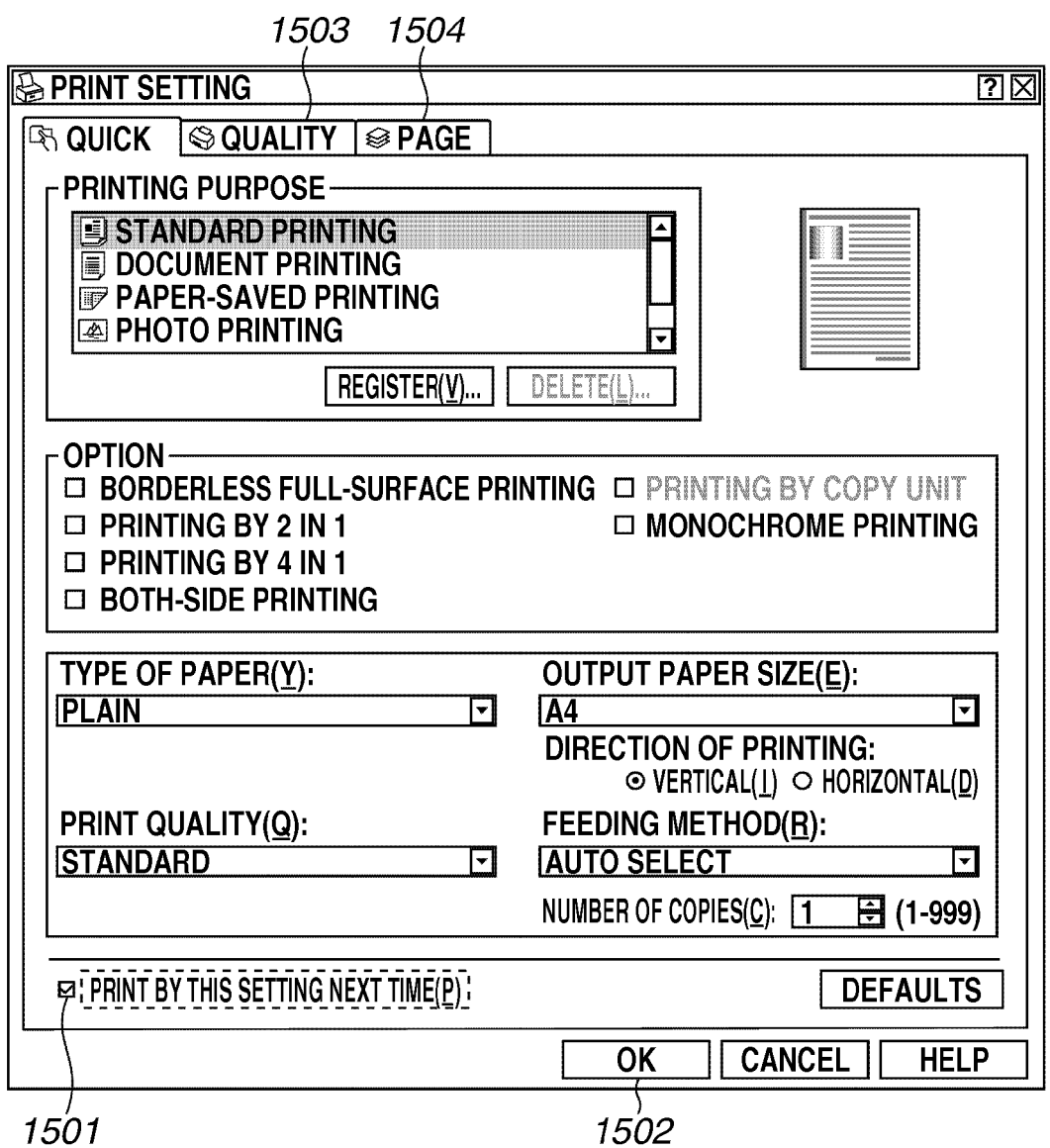
FIG. 15 illustrates an example of a user interface for print setting according to a fourth exemplary embodiment of the present invention.

FIG. 15 illustrates a configuration example of a user interface of a fourth exemplary embodiment. The UI includes a check box 1501 prepared for "PRINTING BY THIS SETTING NEXT TIME". When the check box 1501 is checked based on user's instruction, and an OK button 1502 is pressed, current setting is stored as a user default.

Next time a printing instruction is received from an application of the user of the same account, if no setting change is made, printing processing is performed based on the stored print setting.

In the exemplary embodiment, the check box 1501 is disposed only in this tab sheet (setting screen of quick setting tab). However, check boxes 1501 may similarly be present on other tab sheets, for example, setting screens of a quality setting tab 1503 and page setting tab 1504.

Even in such a case, when the OK button is pressed in a checked state of the check box 1501 present on each setting screen, all print settings set on each sheet are stored.

A detailed driver operation when the check box 1501 indicating a "PRINTING BY THIS SETTING NEXT TIME" function disposed only in this tab sheet is checked and the OK button 1502 is pressed will be described. When the OK button 1502 is pressed in other setting sheets, all settings are stored by the similar procedure.

A user can store default setting that is easily reusable by using a setting preset according to a selected printing purpose. A method highly convenient for a user who finds it bothersome to register a new printing purpose while only a small setting change has been made can be provided.

Because a user does not recognize a change of a user default made by the function, the user's intention for the printing may not be satisfied. Thus, when the OK button 1502 is pressed in the checked status of the check box 1501, a confirmation dialog illustrated in FIG. 16 may be separately displayed.

Figure 16:
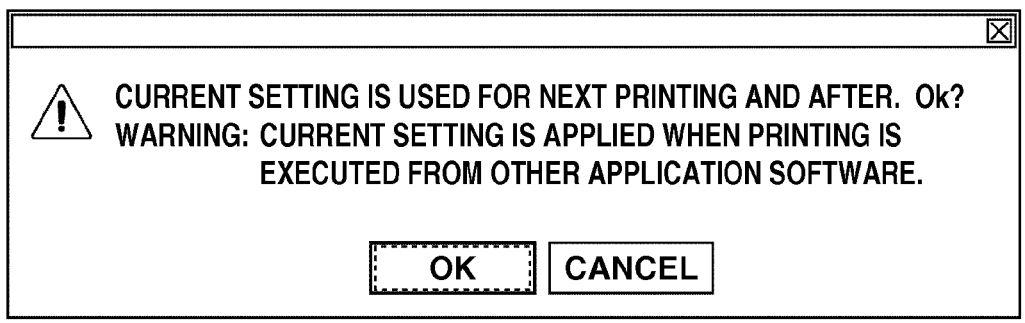
FIG. 16 illustrates a confirmation dialog according to the fourth embodiment of the present invention.

In the confirmation dialog of FIG. 16, a detailed warning of "current setting will be used next time" is displayed.

Referring to a flowchart of FIG. 17, processing of the user interface driver 203 according to the exemplary embodiment will be described.

When the OK button 1502 is pressed, in step S1701, the user interface driver 203 determines whether the check box 1501 has been checked. If the check box 1501 has been checked (YES in step S1701), the processing proceeds to step S1702. If not checked (NO in step S1701), the processing proceeds to step S1704.

In step S1702, the user interface driver 203 determines whether the user has selected OK via the confirmation dialog illustrated in FIG. 16. If the user has selected OK (YES in step S1702), the processing proceeds to step S1703. If the user has selected CANCEL (NO in step S1702), the processing proceeds to step S1704.

In step S1703, the user interface driver 303 performs control to register current setting set on the print setting screen as a user default.

In step S1704, the user interface driver 203 returns the current setting to the application 201 and continues the printing processing.

In a fifth exemplary embodiment of the present invention, an OS has a function of storing one combination of print settings (default registration) for each printing system (e.g., PC) as default setting in addition to a user default.

This function is convenient when the same setting is commonly used by a plurality of users who login a computer and have different accounts. Print setting information obtained by an application from a printer driver is set to a system default when no user default setting has been stored.

If a user default has been customized to be stored even once, in the user account, print setting information obtained by the application may be a user default.

The exemplary embodiment provides a method for storing current setting as a system default.

Figure 18:
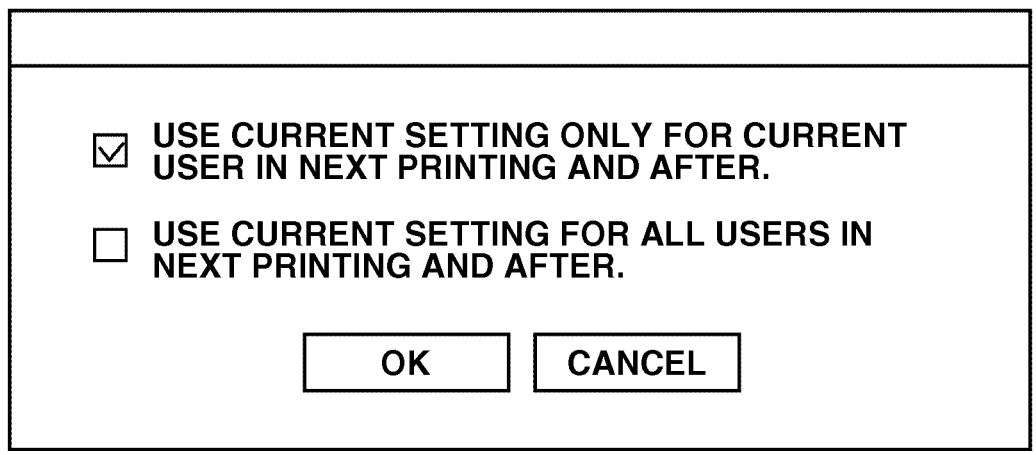
FIG. 18 illustrates an example of a confirmation dialog for designating storage as a system default or a user default according to a fifth embodiment of the present invention.

For example, after displaying of the confirmation dialog of FIG. 16, a confirmation dialog may be provided, prompting a user to select one of a user default and a system default to store the current setting as illustrated in FIG. 18.

For example, when a PC administrator wishes to temporarily update setting as print setting for all users, the setting may be stored as a system default. In FIG. 18, "USE CURRENT SETTING ONLY FOR CURRENT USER IN NEXT PRINTING AND AFTER" is checked, and hence the current setting is stored as the user default.

Figure 19:
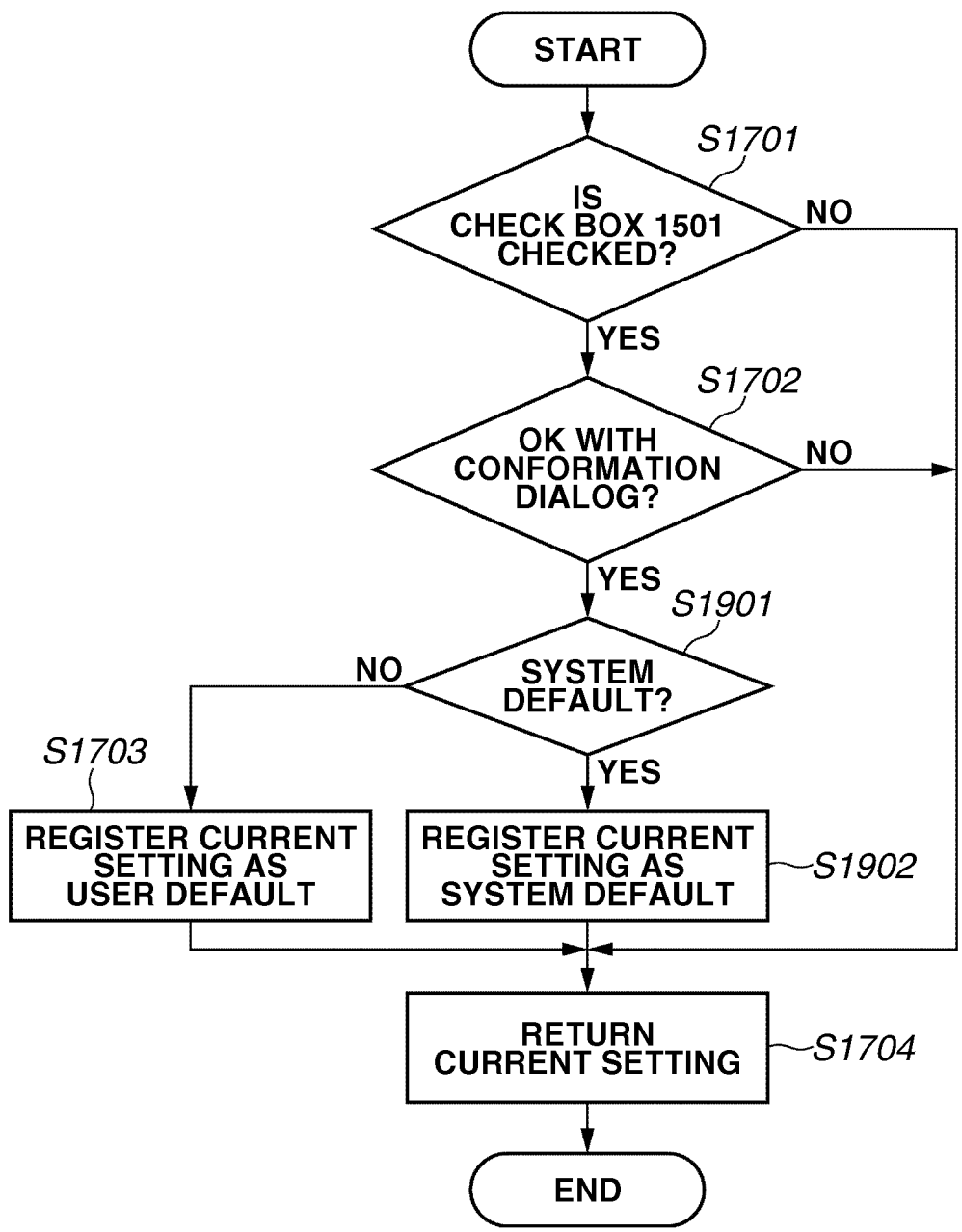
FIG. 19 is a flowchart illustrating control when print setting is performed according to the fifth embodiment of the present invention.

Referring to FIG. 19, processing of a user interface driver 203 of the exemplary embodiment will be described.

Figure 17:
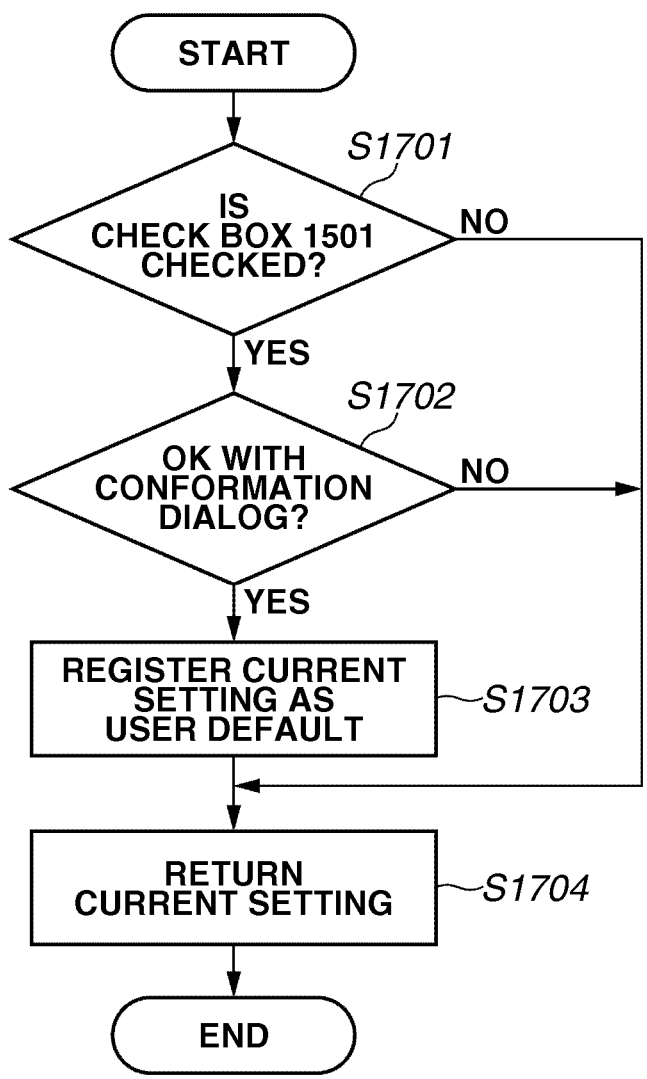
FIG. 17 is a flowchart illustrating control when print setting is performed according to the fourth embodiment of the present invention.

In this processing, processing performed in response to an instruction based on the confirmation dialog illustrated in FIG. 18 (step S1901 and subsequent steps) is different from that illustrated in FIG. 17. The processing different from that of FIG. 17 will be described below.

In step S1901, the user interface driver 203 determines whether the user has instructed to store the current setting as a system default via the confirmation dialog illustrated in FIG. 18.

If the user stores the current setting as a system default (YES in step S1901), the processing proceeds to step S1902. If the user stores the current setting as a user default (NO in step S1901), the processing proceeds to step S1703.

In step S1902, the user interface driver 203 performs control to register the current setting set on a print setting screen as a system default.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An information processing apparatus for setting setting values for a plurality of setting items about print data to be transmitted to a printer, comprising:
   a display unit configured to display a sheet for setting setting values for print data on a display device;
   a selection unit configured to select, via the sheet, one of a plurality of candidates;
   a first providing unit configured to provide, on the sheet, a variable setting item for setting a setting value from a list of a plurality of setting values associated with the selection by the selection unit; and
   a second providing unit configured to provide, on the sheet, fixed setting including setting items that are not dependent on the selection by the selection unit and are included in the plurality of setting items,
   wherein the plurality of setting values in the list related to the variable setting item are setting values of two or more corresponding setting items among the plurality of setting items about the print data and the plurality of setting values in the list are not categorized by each corresponding setting item.

2. The information processing apparatus according to claim 1, wherein setting values set from the variable setting item and setting values set from the setting items included in the fixed setting are set by using different setting ways on the sheet.

3. The information processing apparatus according to claim 2, wherein a plurality of setting values included in the variable setting item are set by using a check box, and one of a plurality of setting values included in the fixed setting is set by using a pull-down menu.

4. The information processing apparatus according to claim 1, wherein the plurality of candidates corresponds to a plurality of purposes.

5. The information processing apparatus according to claim 4, wherein when the selection unit selects a printing purpose of the plurality of purposes as one of the plurality of candidates, a setting value associated with the selected printing purpose is set for the print data.

6. The information processing apparatus according to claim 1, further comprising a registration unit configured to register setting values set for the print data from the variable setting item and the fixed setting in association with a new candidate designated from a user via the sheet.

7. The information processing apparatus according to claim 1, further comprising a default registration unit configured to register setting values set for the print data from the variable setting item and the fixed setting as default setting values for next print setting via the sheet,
wherein the default registration unit registers the default setting values as one of a system default used for all users who log in the information processing apparatus and a user default used by a user who has designated the default setting values.

8. The information processing apparatus according to claim 1, wherein at least one of setting values set from the variable setting item is permitted to be set from any one of the setting items included in the fixed setting.

9. The information processing apparatus according to claim 1, wherein, when a different sheet is displayed on the display device, a desirable setting value is permitted to be set from a detail setting screen of an item corresponding to the setting value set from the variable setting item.

10. An information processing method in an information processing apparatus for setting setting values for a plurality of setting items about print data to be transmitted to a printer, comprising:
displaying a sheet for setting setting values for print data on a display device;
selecting, by a selection unit, via the sheet, one of a plurality of candidates;
providing, on the sheet, a variable setting item for setting a setting value from a list of a plurality of setting values associated with the selection by the selection unit; and
providing, on the sheet, fixed setting including setting items that are not dependent on the selection by the selection unit and are included in the plurality of setting items,
wherein the plurality of setting values in the list related to the variable setting item are setting values of two or more corresponding setting items among the plurality of setting items about the print data and the plurality of setting values in the list are not categorized by each corresponding setting item.

11. The information processing method according to claim 10, wherein setting values set from the variable setting item and setting values set from the setting items included in the fixed setting are set by using different setting ways on the sheet.

12. The information processing method according to claim 11, wherein a plurality of setting values included in the variable setting item are set by using a check box, and one of a plurality of setting values included in the fixed setting is set by using a pull-down menu.

13. The information processing method according to claim 10, wherein the plurality of candidates corresponds to a plurality of purposes.

14. The information processing method according to claim 13, wherein when the selection unit selects a printing purpose of the plurality of purposes as one of the plurality of candidates, a setting value associated with the selected printing purpose is set for the print data.

15. The information processing method according to claim 10, further comprising registering setting values set for the print data from the variable setting item and the fixed setting in association with a new candidate designated from a user via the sheet.

16. The information processing method according to claim 10, further comprising registering setting values set for the print data from the variable setting item and the fixed setting as default setting values for next print setting via the sheet,
wherein the registering step registers the default setting values as one of a system default used for all users who log in the information processing apparatus and a user default used by a user who has designated the default setting values.

17. The information processing method according to claim 10, wherein at least one of setting values set from the variable setting item is permitted to be set from any one of the setting items included in the fixed setting.

18. The information processing method according to claim 10, wherein, when a different sheet is displayed on the display device, a desirable setting value is permitted to be set from a detail setting screen of an item corresponding to the setting value set from the variable setting item.

19. A non-transitory computer readable storage medium on which is stored a computer program for causing a computer to execute a method for setting setting values for a plurality of setting items about print data to be transmitted to a printer, comprising:
displaying a sheet for setting setting values for print data on a display device;
selecting, by a selection unit, via the sheet, one of a plurality of candidates;
providing, on the sheet, a variable setting item for setting a setting value from a list of a plurality of setting values associated with the selection by the selection unit; and
providing, on the sheet, fixed setting including setting items that are not dependent on the selection by the selection unit and are included in the plurality of setting items,
wherein the plurality of setting values in the list related to the variable setting item are setting values of two or more corresponding setting items among the plurality of setting items about the print data and the plurality of setting values in the list are not categorized by each corresponding setting item.

* * * * *